United States Patent
Knierbein et al.

(10) Patent No.: US 9,313,949 B2
(45) Date of Patent: Apr. 19, 2016

(54) COMBINE HARVESTER COMPRISING A CHOPPING MECHANISM

(71) Applicant: CLAAS SELBSTFAHRENDE ERNTEMASCHINEN GMBH, Harsewinkel (DE)

(72) Inventors: Claudius Knierbein, Lippetal-Herzfeld (DE); Stefan Teroerde, Warendorf (DE); Norbert Strieker, Verl (DE); Christopher Vieregge, Doerentrup (DE); Stefan Schiewer, Lage (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 3 days.

(21) Appl. No.: 14/458,626

(22) Filed: Aug. 13, 2014

(65) Prior Publication Data

US 2015/0050969 A1 Feb. 19, 2015

(30) Foreign Application Priority Data

Aug. 19, 2013 (DE) .......................... 10 2013 108 923

(51) Int. Cl.
  *A01D 41/12* (2006.01)
(52) U.S. Cl.
  CPC .................................. *A01D 41/1243* (2013.01)
(58) Field of Classification Search
  CPC ... A01D 41/12; A01D 41/1243; A01D 61/02; A01F 12/40; A01F 12/46
  USPC .................... 460/111, 112, 119; 56/192, 503; 239/655, 679, 682, 687, 689
  See application file for complete search history.

(56) References Cited

U.S. PATENT DOCUMENTS

| 3,186,460 | A | * | 6/1965 | Frederick | ................ | A01F 12/40 100/906 |
| 4,292,795 | A | * | 10/1981 | Linn | ...................... | A01F 12/40 460/111 |
| 4,526,180 | A | * | 7/1985 | Scott | ...................... | A01F 12/40 239/672 |
| 4,591,102 | A | * | 5/1986 | Clarke | ............... | A01D 41/1243 239/655 |
| 4,917,652 | A | * | 4/1990 | Glaubitz | ............ | A01D 41/1243 239/682 |
| 7,993,188 | B2 | * | 8/2011 | Ritter | ................. | A01D 41/1243 460/111 |
| 8,105,140 | B2 | * | 1/2012 | Teroerde | ............ | A01D 41/1243 460/112 |

FOREIGN PATENT DOCUMENTS

DE  197 50 393  4/1998

\* cited by examiner

*Primary Examiner* — Robert Pezzuto
(74) *Attorney, Agent, or Firm* — Michael J. Striker

(57) ABSTRACT

A combine harvester has a chopping mechanism and a spreading mechanism. The spreading mechanism is disposed downstream of the chopping mechanism, mechanically driven by a drive train and includes at least two rotors. The drive train of the spreading mechanism has a belt drive engageable by a clutch and configured to drive a first transmission stage via an output shaft, at least one second transmission stage drivably connected to the first transmission stage by a shaft and a braking device. The first and second transmission stages each have an output shaft for driving one or each of the rotors.

12 Claims, 3 Drawing Sheets

COMBINE HARVESTER COMPRISING A CHOPPING MECHANISM

CROSS-REFERENCE TO A RELATED APPLICATION

The invention described and claimed hereinbelow is also described in German Patent Application DE 10 2013 108923.2, filed on Aug. 19, 2013. The German Patent Application, the subject matters of which is incorporated herein by reference, provides the basis for a claim of priority of invention under 35 U.S.C. 119(a)-(d).

BACKGROUND OF THE INVENTION

The present invention relates to a combine harvester comprising a chopping mechanism and a spreading mechanism which is disposed downstream thereof.

Document DE 197 50 393 A1 makes known a mechanical drive for a chaff spreader, which is disposed downstream of a cleaning mechanism and comprises two or more fan units that are mechanically driven. To this end, a V-belt pulley is disposed on a shaft in a freely rotatable manner that is connectable in a non-positive manner to the V-belt pulley by a clutch. The V-belt pulley is driven via a drive train of the combine harvester, although this is not specified in greater detail. A universal drive shaft is connected to the shaft. The universal drive shaft transfers an introduced torque to a drive shaft of a bevel gear assembly. A V-belt pulley that drives the other fan units via a V-belt is mounted on the output shaft of the bevel gear assembly, which drives one of the fan units. This form of the drive for a spreading mechanism is characterized by high complexity.

SUMMARY OF THE INVENTION

The present invention overcomes the shortcomings of known arts, such as those mentioned above.

To that end, the present invention provides a combine harvester characterized by a simple and energy-efficient drive of the spreading mechanism thereof.

In an embodiment, the invention embodies a combine harvester with a chopping mechanism and a spreading mechanism disposed downstream thereof. The spreading mechanism is mechanically driven by a drive train and has at least two rotors. The drive train of the spreading mechanism comprises a belt drive that is engaged by a clutch and which drives a first transmission stage via an output shaft, at least one second transmission stage that is drivably connected to the first transmission stage by a shaft and a braking device. Each transmission stage comprises at least one output shaft for driving the rotor.

The mechanical drive of the spreading mechanism has the advantage over a hydraulic drive that the mechanical drive is characterized by the speed stability thereof, which results in greater stability of distribution. In light of safety requirements on the operation of spreading mechanisms, the rotors of which are disposed in an at least partially exposed manner, it is necessary to avoid long run-on times resulting from inertia. A clutch and a brake are therefore integrated in the drive train and disengage said drive train in order to decouple the drive train of the spreading mechanism from the combine harvester and actively brake the rotors. Rapid braking of the spreading mechanism and the rotors is thereby achieved.

Preferably, the belt drive is coupled to the chopping mechanism on the drive side. This coupling is advantageous given the fact that the chopping mechanism and the spreading mechanism are always both either active or inactive. If the chopping mechanism is shut off in order to switch to the swath-depositing mode, the drive of the spreading mechanism is also automatically idled.

Preferably, the belt drive is driven by a step drive. Given that the belt wraps from a pulley having a relatively large diameter onto a pulley having a relatively small diameter, speed adjustment can be easily implemented. This is significant when processing crop such as corn, for example, which, due to the properties thereof, requires a lower drive speed of the chopping mechanism although the spreading width remains unchanged, and therefore the drive speed of the spreading mechanism must be substantially higher than that of the chopping mechanism. An appropriate gear ratio can be implemented by the step drive.

As an alternative, the belt drive is driven by a variator. The variator permits stepless adjustment of the drive speed of the spreading mechanism, thereby improving the adaptation to changing harvesting conditions. The belt drive is used as a clutch in particular. The drive train is interruptible by the belt drive, which is used as a clutch, when the intention is to idle the chopping mechanism and the spreading mechanism. The use of the belt drive as a clutch is a cost-effective solution, since additional components in the drive train can be omitted.

To this end, the belt drive comprises a tensioning roller, which is actuated by an actuator. The tensioning roller is necessary in combination with a step drive or a variator in order to maintain the belt tension. The actuator is controlled accordingly in order to apply the necessary belt tension when the belt is installed, for example. On the other hand, if the spreading mechanism and, therefore, the exposed rotors must be halted because the combine harvester is supposed to be switched to a different crop type. For example, the actuator is controlled such that the belt tension is not maintained, namely the clutch is disengaged.

In an advantageous embodiment, the actuator is a hydraulically actuatable lifting cylinder. The lifting cylinder is designed as a single-acting lifting cylinder in particular. In this case, the single-acting lifting cylinder comprises a spring element, which subjects the lifting cylinder to a force on the face end that is used to return the lifting cylinder when the clutch is disengaged. The single-acting lifting cylinder is connectable to the tensioning roller via a lever arrangement such that the tensioning roller is pressed against the belt when the connecting rod is retracted, whereas the tensioning roller is moved away from the belt when the connecting rod is extended. The clutch is active when the connecting rod is retracted into the lifting cylinder, whereas the clutch is disengaged when the connecting rod is extended.

In particular, the lifting cylinder is coupled to a first hydraulic circuit on the combine harvester and the brake is coupled to a second hydraulic circuit on the combine harvester, wherein these two hydraulic circuits operate using different hydraulic pressures. In this case, the lifting cylinder is permanently subjected to the hydraulic pressure of the second hydraulic circuit and temporarily subjected to the hydraulic pressure of the first hydraulic circuit, whereas the brake is connected only to the first hydraulic circuit or is decoupled therefrom.

In a development, the brake and the clutch are engageable via a common valve. The valve is acted upon preferably hydraulically and is used to selectively engage the brake or the clutch. To this end, the valve comprises two switching positions such that the brake is released when the clutch is actuated, whereas the brake is actuated when the clutch is disengaged. This is achieved in the case of a single-acting lifting cylinder by virtue of the fact that, in a first switching position, in which the clutch is engaged and the brake is inactive, the lifting cylinder is subjected on the rod end to the hydraulic pressure of the first hydraulic circuit, which is greater than that of the second hydraulic circuit. Therefore, the lifting cylinder engages the clutch in order to maintain the belt tension by the tensioning roller, whereas the hydraulic pressure of the second hydraulic circuit is present on the face end.

In contrast, in the first switching position of the valve, the brake is decoupled from the first hydraulic circuit and is therefore not subjected to a hydraulic pressure, and so the brake is located in a released position. In the second switching position of the valve, in which the clutch is disengaged and the brake is active, the brake is subjected to the hydraulic pressure of the first hydraulic circuit. In the second switching position of the valve, the lifting cylinder is separated from the first hydraulic circuit on the rod end, and therefore the connecting rod of the lifting cylinder is extended by the hydraulic pressure of the second hydraulic circuit, which is present on the face end, and is supported by a spring force present on the face end. As a result, the lever arrangement is actuated such that the tensioning roller is moved away from the belt drive, i.e., the clutch is disengaged.

Preferably, the brake is disposed at one of the further transmission stages. Alternatively, the brake can be disposed in a pulley of the drive train. To this end, the brake is designed as a drum brake.

In that case, the valve is switchable depending on the operating state of the chopping mechanism. The valve is switched depending on the operating state of the chopping mechanism, wherein, during operation of the chopping mechanism, the valve is switched such that the clutch is actuated in order to drive the rotors of the spreading mechanism, while the brake is held in the released position. When the chopping mechanism is switched off, the valve is controlled such that the brake is actuated, while the clutch is held in the released position, and therefore the belt drive cannot transfer drive torque to the spreading mechanism. Preferably, the valve is designed as a gate valve.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
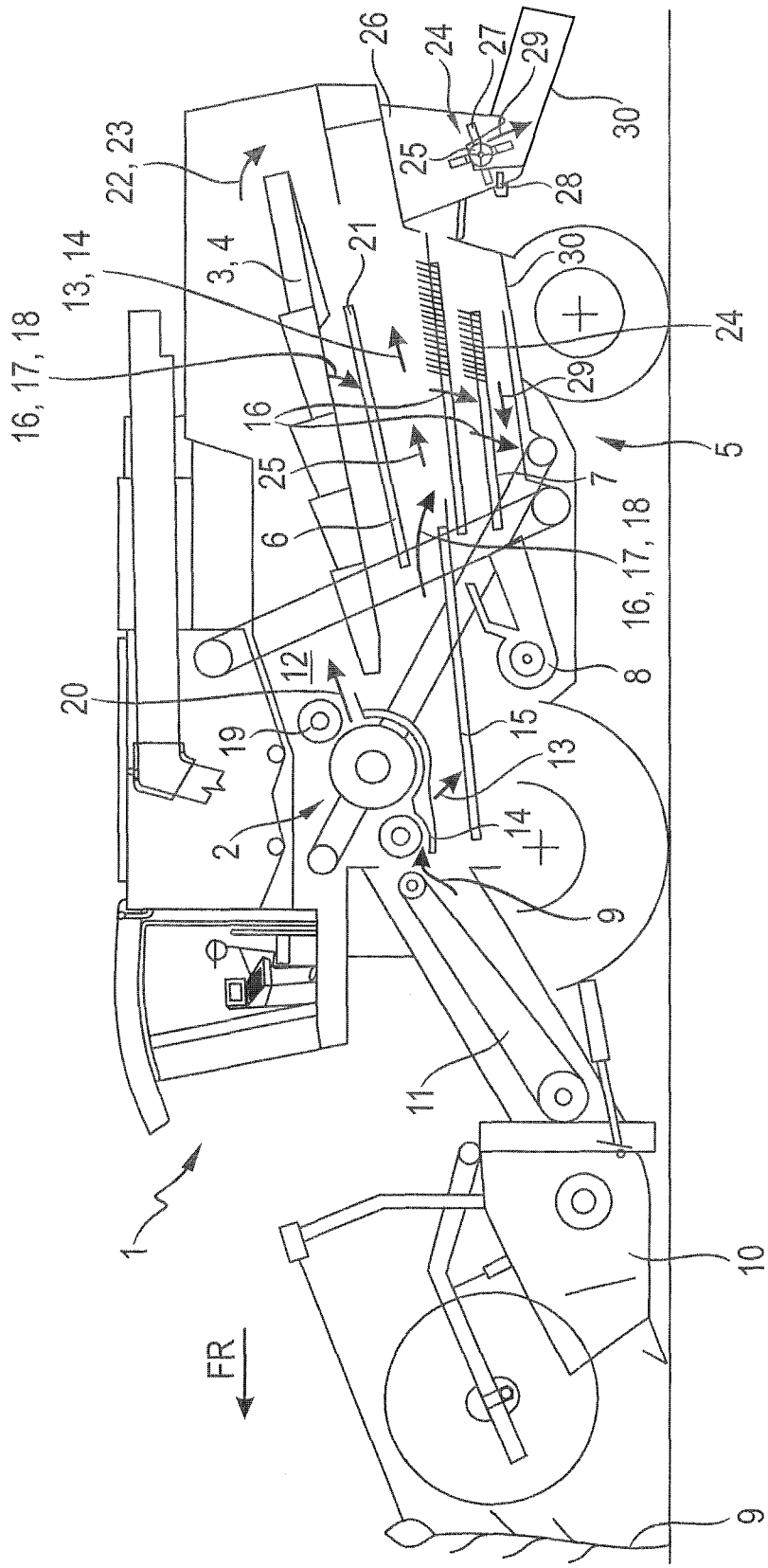
FIG. 1 depicts a schematic side view of a combine harvester.

FIG. 1 depicts a side view of a harvesting machine designed as a combine harvester 1, comprising a threshing mechanism 2, which is known per se and is therefore not described in greater detail, and a downstream tray-type shaker 3, as the separating device 4. A cleaning mechanism 5 is disposed underneath the tray-type shaker 3 and comprises two sieves 6, 7, which are disposed one above the other, and a cleaning fan 8. The invention is expressly not limited to types of combine harvesters having this design, however, and, in fact also relates, for example, to combine harvesters having axial separating rotors as the separating device, and to combine harvesters having an axially disposed threshing-separating mechanism.

A header 10 is disposed in the front region of the combine harvester 1 and is used to cut and pick up the crop 9. The header 10 conveys the crop 9 to a feed rake 11, which is disposed on the front side of the combine harvester 1. The feed rake 11 transfers the crop 9 to the threshing mechanism 2 disposed in the machine housing 12 in order to be threshed. A grain-chaff mixture 13, which is composed mainly of grain, is separated at the threshing and separating grate 14 of the threshing mechanism 2 and travels via a grain pan 15 to the cleaning mechanism 5, in order to separate the grain 16 from the non-grain components, i.e., from stalk parts 17 and chaff parts 18.

In the rear region, a rotating impeller 19 is assigned to the threshing mechanism 2 and receives the crop stream 20 that emerges from the threshing mechanism 2. Crop stream 20 is composed substantially of threshed stalks. The impeller conveys the crop stream to the tray-type shaker 3, which conveys the crop stream 20 into the rear region of the combine harvester 1. Any grain 16 still contained in the crop stream 20 and any short straw 17 and chaff 18 are separated out by falling through the tray-type shaker 3, which is provided with sieve openings, to a return pan 21. The return pan 21 transports the grain 16, short straw 17, and chaff 18 to the grain pan 15.

The grain 16, short straw 17 and chaff 18 ultimately reach the cleaning mechanism 5, likewise via the grain pan 15, in which the grain 16 is separated from the short straw 17 and the chaff 18. The straw 22 and a certain percentage of waste grain 23 travel via the tray-type shaker 3 to the rear end of the combine harvester 1, from where this is conveyed to a chopping mechanism 24 and to a spreading mechanism 30 dedicated thereto. The chopping mechanism 24 comprises, inter alia, a rotating chopper drum 25, which is supported in a chopper housing 26. The chopper drum 25 is equipped with movable knives 27, which mesh with counter-knives 28 which are fixedly disposed in the chopper housing 26. The knives 27 and the counter-knives 28 are used to chop the straw 22 into chopped crop and accelerate same.

A sieve overflow, which is composed largely of chaff and does not pass through the upper sieve 6, travels via the upper sieve 6 into the rear region of the combine harvester 1 and can be likewise conveyed to the chopping mechanism 24. The crop stream 29, which emerges from the chopping mechanism 24 and substantially comprises chopped straw 22 and chaff, is conveyed further to a spreading mechanism 30, which spreads the crop stream 29 on the field.\

Figure 2:
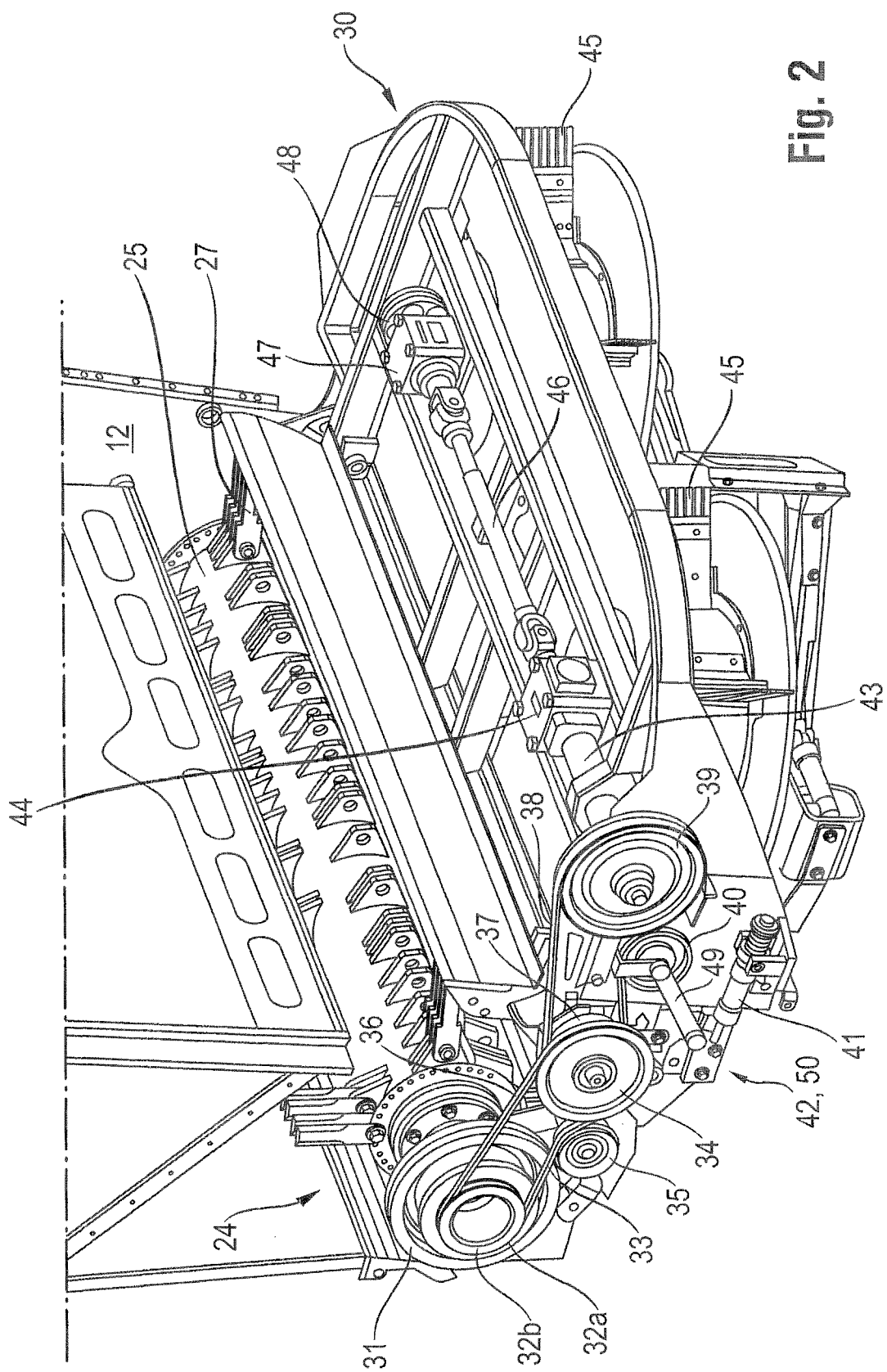
FIG. 2 depicts a perspective view of a chopping and spreading mechanism according to FIG. 1.

The representation in FIG. 2 shows a perspective view of a chopping and spreading mechanism 24, 30 of a combine harvester 1 according to FIG. 1, including a perspective view of the drive train of the spreading mechanism 30. The chopping mechanism 24 is disposed in the machine housing 12, as described above. The chopping mechanism 24 is driven by a belt (not shown) that wraps around a drive pulley 31 disposed coaxially to the chopper drum 25. Two driven pulleys 32a, 32b, which have different diameters and form a step drive 33, are disposed adjacent and coaxially to the drive pulley 31. The step drive 33 is connected to an intermediate drive stage 34 by a driven belt 36. A tensioning device 35 maintains the belt tension of the driven belt 36. The intermediate drive stage 34 comprises a driven pulley 37, around which a drive belt 38 is wrapped. The drive belt 38 also wraps around a drive pulley 39, which is used to drive the spreading mechanism 30.

The belt tension of the drive belt 38 is maintained by a tensioning system 49 comprising a tensioning roller 40, which can be actuated by an actuator. The actuator is designed as a hydraulically actuatable lifting cylinder 41, which is single-acting. The connecting rod of the lifting cylinder 41 actuates the tensioning roller 40 by means of a lever arrangement 49 by pressing the tensioning roller 40 against the drive belt 38 or moving said tensioning roller away from said drive belt. In the present exemplary embodiment, a clutch 42 is in an engaged state, and therefore the drive belt 38 can transfer torque from the driven pulley 37 to the drive pulley 39.

An output shaft 43 extends from the drive pulley 39 and leads into a first transmission stage 44, which is designed as a bevel gear assembly. A drive shaft (not illustrated) extends from the first transmission stage 44, perpendicularly to the output shaft 43, and is used to drive a rotor 45 of the spreading mechanism 30. In addition, a universal drive shaft 46 extends from the first transmission stage 44 and drivably connects the first transmission stage 44 to a second transmission stage 47. A drive shaft (not illustrated for clarity) also extends from the second transmission stage 47, perpendicularly to the output shaft 43, and is used to drive a further rotor 45 of the spreading mechanism 30. A brake 48 is disposed at the second transmission stage 47, coaxially to the output shaft 43.

The mode of operation of the drive train of the spreading mechanism 30 is explained in greater detail in the following. The chopping mechanism 24 is driven by the drive pulley 31, as described above. A further drive pulley (not identified in FIG. 2) is disposed coaxially to and behind the drive pulley 31 and has a smaller diameter, thereby enabling the chopping mechanism 24 to be driven at different speeds. A relatively slow drive speed is implemented for processing corn, as the crop type, in particular, in order to prevent damage to the chopping mechanism 24. The step drive 33 compensates for this speed reduction in the case of a mechanical drive of the spreading mechanism 30 by transforming the reduced drive speed of the chopping mechanism 24 to the output speed for driving the spreading mechanism 30 that is required for maintaining a constant spreading width. As an alternative to the step drive 33, in an advantageous embodiment, a variator can also be provided, which simplifies the adaptation of the speed ratio and ensures the stepless implementation thereof.

Figure 3:
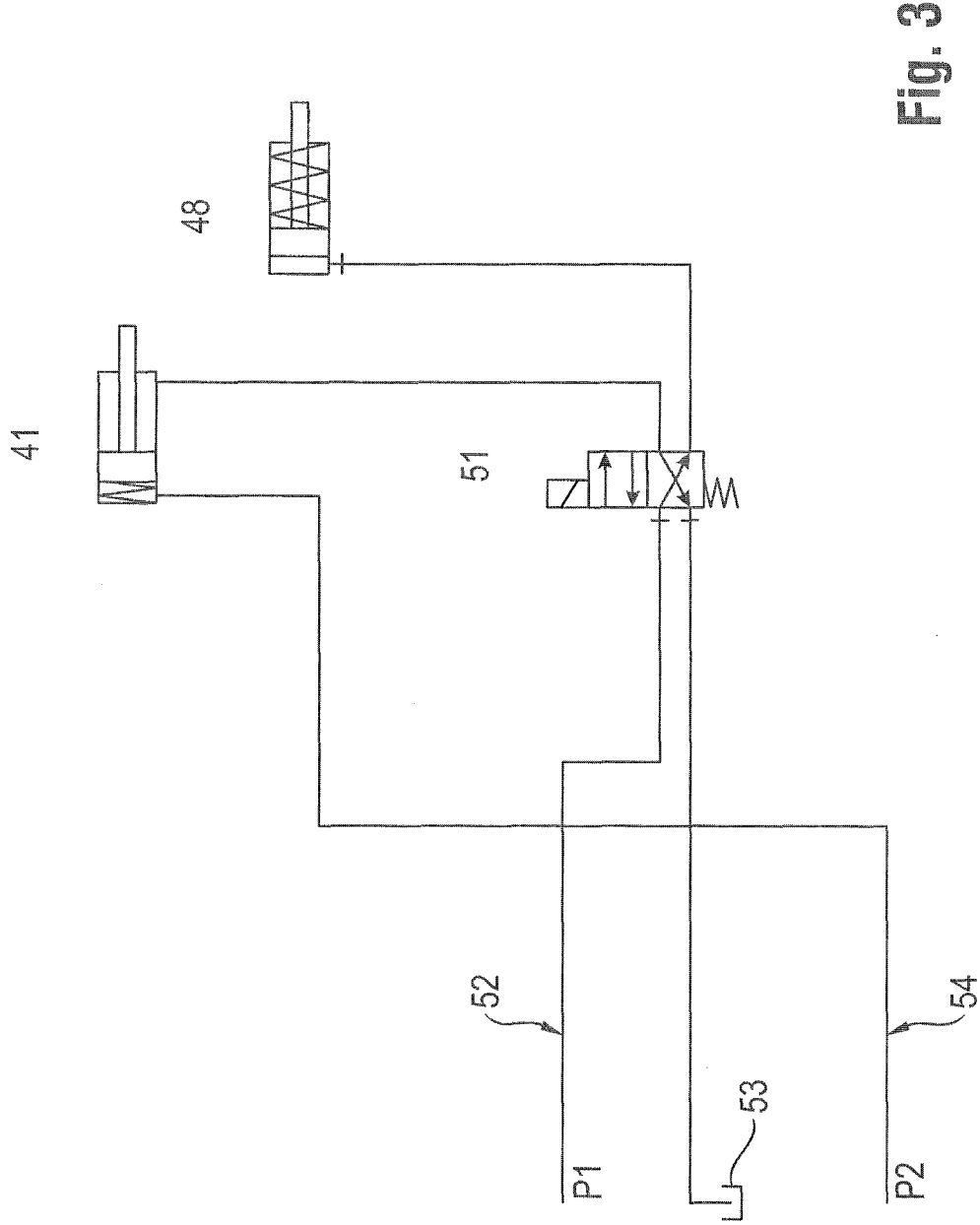
FIG. 3 depicts a section of a hydraulic circuit diagram of the spreading mechanism.

The belt tension of the drive belt 38, which wraps around the intermediate drive 34 and the drive pulley 39, is maintained by a tensioning system 50. The hydraulically actuatable lifting cylinder 41 is acted upon accordingly by a hydraulic pressure in order to hold the belt tension of the drive belt 38 substantially constant. The lifting cylinder 41 is acted upon by the connection to a hydraulic circuit of the combine harvester 1, which is explained below by reference to the section of a hydraulic circuit diagram of the combine harvester 1 represented in FIG. 3.

The belt drive, which comprises the intermediate drive 34, the tensioning system 50, the drive pulley 39, and the drive belt 38, functions as a clutch 42 when the chopping mechanism 24 is switched off. In this case, the hydraulic pressure required to hold the lifting cylinder 41 in the position thereof that tensions the drive belt 38 against the force of the spring element is not present and the lifting cylinder 41 is therefore retracted. The tensioning roller 40 is withdrawn by the lever arrangement 49, thereby preventing the drive belt 38 from transferring torque from the intermediate drive 34 to the drive pulley 39. In order to simultaneously activate the brake 48 at the second transmission stage 47 and thereby actively brake both rotors 45, the lifting cylinder 41 and the brake 48 are operatively connected via a valve 51, as shown in the excerpt of the circuit diagram in FIG. 3.

The valve 51, which is designed as a 4/2-directional control valve, permits only two switching states, and therefore either the clutch is active due to action thereupon by the lifting cylinder 41, or the brake 48 is active. The valve 51 is controlled depending on the particular operating state of the chopping mechanism 24. When the chopping mechanism 24 is non-operational, as shown in the section of the circuit diagram according to FIG. 3, a first hydraulic pressure P1 of a first hydraulic circuit 52 of the combine harvester 1 is present at the valve 51, wherein this pressure acts on the brake 48 with a hydraulic pressure against the return force of a spring element, and therefore the brake 48 is active and the rotor 45 brakes. In this switching position of the valve 51, a second hydraulic pressure P2 of a second hydraulic circuit 54 is present at the single-acting lifting cylinder 41 on the face end, thereby extending the lifting cylinder 41, and so the lever arrangement 49 moves the tensioning roller 40 away from the drive belt 38, i.e., the clutch is disengaged. To this end, the first hydraulic pressure P1 is greater than the second hydraulic pressure P2.

When the chopping mechanism 24 is switched on, the valve 51 is controlled accordingly in order to activate the clutch 42 and simultaneously deactivate the brake 48. To this end, the switching of the valve 51 depressurizes the brake 48, i.e., the hydraulic oil flows back into a tank 53, while the lifting cylinder 41 is acted upon on the rod end with the first hydraulic pressure P1, thereby retracting the piston thereof against the second hydraulic pressure P2 present on the face end, and thereby activating the clutch 42. The tensioning roller 40 is therefore pressed against the drive belt 38 by the lever arrangement 49, as is evident from the representation in FIG. 2.

LIST OF REFERENCE CHARACTERS 1 combine harvester
2 threshing mechanism
3 tray-type shaker
4 separating device
5 cleaning mechanism
6 sieve
7 sieve
8 cleaning fan
9 crop
10 header
11 feed rake
12 machine housing
13 grain-chaff mixture
14 separating grate
15 grain pan
16 grain
17 stalk part
18 chaff part
19 impeller
20 crop stream
21 return pan
22 straw
23 waste grain
24 chopping mechanism
25 chopper drum 26 chopper housing
27 knife
28 counter-knife
29 crop stream
30 spreading mechanism
31 drive pulley
32 driven pulley
33 step drive
34 intermediate drive stage
35 tensioning device
36 driven belt
37 driven pulley
38 drive belt
39 drive pulley
40 tensioning roller
41 lifting cylinder
42 clutch
43 output shaft
44 first transmission stage
45 rotor
46 universal drive shaft
47 second transmission stage
48 brake
49 lever arrangement
50 tensioning system
51 valve
52 first hydraulic circuit
53 tank
54 second hydraulic circuit
P1 first hydraulic pressure
P2 second hydraulic pressure As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester, comprising a chopping mechanism and a spreading mechanism, the spreading mechanism disposed downstream of the chopping mechanism, mechanically driven by a drive train and including at least two rotors, wherein the drive train of the spreading mechanism comprises:
   a belt drive engageable by a clutch and configured to drive a first transmission stage via a belt drive output shaft,
   at least one second transmission stage drivably connected to the first transmission stage by a universal drive shaft, wherein the first and second transmission stages comprise respective first stage and second stage output shafts for driving one or each of the at least two rotors, and
   a braking device.

2. The combine harvester according to claim 1, wherein the belt drive is coupled to the chopping mechanism on a drive side.

3. The combine harvester according to claim 1, wherein the belt drive is driven by a step drive.

4. The combine harvester according to claim 1, wherein the belt drive is driven by a variator.

5. The combine harvester according to claim 1, wherein the belt drive is actuatable to drive the belt drive output shaft in a clutch-like manner.

6. The combine harvester according to claim 1, wherein the belt drive comprises a tensioning roller, which is actuated by an actuator.

7. The combine harvester according to claim 6, wherein the actuator is a hydraulically actuatable lifting cylinder.

8. The combine harvester according to claim 7, wherein the lifting cylinder is coupled to a first hydraulic circuit and the brake is coupled to a second hydraulic circuit of the combine harvester and wherein the first and second hydraulic circuits operate using different hydraulic pressures (P1, P2).

9. The combine harvester according to claim 1, wherein the brake is disposed on one of the further transmission stages.

10. The combine harvester according to claim 1, wherein the brake is disposed in a pulley of the drive train.

11. The combine harvester according to claim 8, wherein the brake and the clutch are engaged via a common valve.

12. The combine harvester according to claim 11, wherein the valve is switched depending on an operating state of the chopping mechanism.

* * * * *